United States Patent Office 3,194,146
Patented July 13, 1965

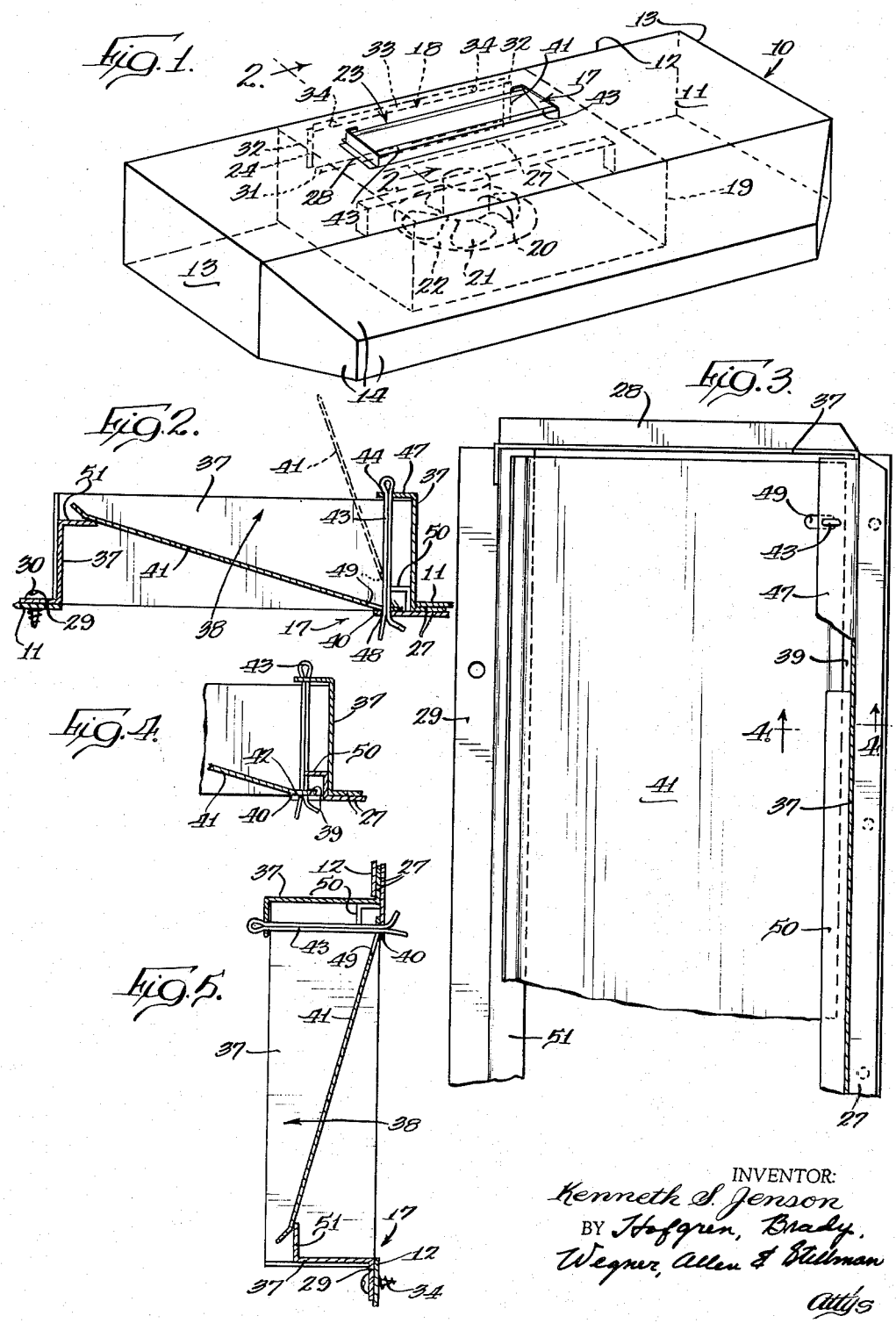

3,194,146
DAMPER DEVICE AND HOOD INCLUDING DAMPER
Kenneth S. Jenson, Wisconsin Rapids, Wis., assignor to Preway, Inc., a corporation of Wisconsin
Filed Nov. 5, 1962, Ser. No. 235,424
3 Claims. (Cl. 98—115)

This invention relates to a damper or valve device and also relates to the inclusion of a damper in a ventilating hood such as a built-in kitchen ventilating hood which is associable with either roof or wall air ventilating duct work.

A general object of this invention is to provide a new and useful damper and especially such a damper associable with a ventilating hood.

Another object of this invention is to provide a new and improved ventilating hood including a damper and having alternately usable air outlet paths from the hood enabling association of the hood with either roof or wall air venting duct work for exhausting air from the hood into such duct work.

Still another object of this invention is to provide a damper or other pivotal member with a new and useful hinge structure.

A further object is to provide a new and useful damper device which includes frame and damper members adapted for pivotal association with respect to each other in such manner that the damper member is pivotable between a closed position blocking a passage through the frame member and an open position unblocking the passage and wherein the damper is releasably retained adjacent the frame member for pivotal movement with respect thereto while permitting free movement of the damper member toward and away from its pivotal bearing association with the frame member.

Another object of this invention is to provide a new and useful damper including a frame member having a passage therethrough, an elongate bearing portion within the passage and a plate member having an elongate bearing portion for pivotal association with the bearing portion of the frame member to pivot between a closed position and an open position for blocking and unblocking the passage respectively.

Still another object of this invention is to provide a damper having a frame member defining a passage therethrough, a plate member adapted for pivotal association with the frame member for blocking and unblocking the passage and to provide for retention of the frame and plate members adjacent each other for pivotal association with each other and including guiding means for guiding the plate member for movement with respect to the frame member to orient the plate member in proper pivotal bearing association.

Yet another object of this invention is to provide a damper in accordance with the foregoing objects including jamb means on the frame member adjacent one end of the passage therethrough for permitting the pivoting of the damper member through the passage from one end to the other whereby the damper member in closed position rests against the jamb and prevents substantial flow of air into the passage from one end of the passage and wherein the damper member in open position is pivoted away from the jamb permitting flow of air through the passage in the other direction; and the provision of stop means preventing movement of the damper member a substantial distance from bearing association with the frame member.

Another object of the invention is to provide a ventilating hood having a casing with an air outlet opening in the top wall and another air outlet opening in the back wall and a cover plate suitable for closing either of the openings and a damper positionable across one of the openings to permit flow of air therethrough from the hood and to prevent substantial back-flow of air therethrough into the hood.

Further objects and advantages will become apparent from the following detailed description taken in connection with the accompanying drawings in which:

FIGURE 1 is a perspective view of an embodiment of the ventilating hood including a damper embodiment installed therein;

FIGURE 2 is a vertical section through the damper of FIGURE 1 along line 2—2 of FIGURE 1 and illustrating the damper assembly and its association with the hood casing;

FIGURE 3 is a partial plan view of the damper assembly removed from the hood of FIGURE 1;

FIGURE 4 is a partial vertical section through the damper assembly along line 4—4 of FIGURE 3; and FIGURE 5 is a section through the damper assembly similar to FIGURE 2 but showing the association and mounting of the assembly on a back wall exhaust outlet of a hood.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated.

As shown in the drawings, a ventilating hood, indicated generally at 10, is adapted for association with either overhead or wall duct work. Ventilating hood 10 is formed generally of a top wall 11, a back wall 12, side walls 13 and a tapered frontal portion 14 and includes exhaust outlet or opening 17 in top wall 11 and exhaust outlet or opening 18 in back wall 12.

Mounted within hood 10 is a blower housing 19 which has a bottom, two sides and a front in association with the inner surfaces of the top and back walls of hood 10 to form an enclosed air passage from housing air inlet 22 to either of exhaust openings 17 or 18. The top of housing 19 is formed by top wall 11 of casing 10 and the back of housing 19 is enclosed by back wall 12 of casing 10. Thus, housing 19 restricts communication of exhaust outlets 17 and 18 with cooking gases within the hood to communicate by means of air inlet 22.

A blower is secured within housing 19 and positioned for drawing air through inlet 22. Hood casing 10 has no bottom and thus air may be drawn into the housing 19 directly through inlet 22 by means of the blower. The blower includes an impeller or fan 21 positioned adjacent air inlet 22 and driven by motor 20 mounted within housing 19 by suitable bracket means. A screen or filter may be disposed across opening air inlet 22 if desired.

As seen in FIGURE 1, hood casing 10 has disposed across exhaust outlet 17 a damper unit 23. A cover member 24 is secured across exhaust outlet 18.

Referring to FIGURES 1 through 5, damper unit 23 includes a frame member 37 of generally rectangular configuration and having walls defining a generally rectangular passage through frame member 37. Along one side of frame member 37 and at the inlet end of passage 38 therethrough, outwardly extending flanges 27 and 29 are provided lengthwise along opposing edges. Outwardly extending opposing flanges 28 are provided on the ends of frame member 37 adjacent the passage inlet side. The damper unit 23 is mounted in opening 17 with flange 27 disposed beneath top wall 11 and flanges 28 and flange 29 resting upon the top surface of top wall 11. The damper unit is releasably secured in position across the top opening by means of machine screws 30 and engagement of flange 27 with the underside of wall 11. Machine screws 30 pass through flange 29 and secure flange 29 to the top surface of top wall 11.

Cover member 24 is positioned across opening 18 for obstruction of flow of air through opening 18. Cover member 24 has peripheral flange 31, flanges 32 and flange 33 which correspond substantially in configuration to damper frame member flange 27, flanges 28 and flange 29 respectively. Cover member 24 is releasably secured in position across opening 18 in a manner similar to the mounting of damper unit 23, i.e., with flange 31 bearing on the inner surface of wall 12 and flange 33 secured to the outer surface of wall 12 by releasable means such as machine screws 34.

It should be apparent that damper unit 23 and cover member 24 are interchangeable between releasable mountings across either of openings 17 or 18. Thus, the cover member may be secured across opening 17 in the same manner that the damper unit 23 is shown secured thereacross, best seen with reference to FIGURE 2. Similarly, the damper unit may be secured across opening 18 with cover member 24 secured across opening 17, FIGURE 5 illustrating the positioning and securing of damper unit 23 across back wall opening 18.

Frame member 37, to which flanges 27 through 29 are secured, defines a passageway 38 from one side thereof to the other, i.e., from the inlet to the outlet thereof. An elongate bearing surface 39 is provided on inward projecting flange 40 of frame 37 within passageway 38. A damper member such as plate 41 is mounted in pivotal association with the frame member 37 for opening and closing passageway 38 for damper operation. Damper plate 41 has an elongate bearing surface 42 on a deviated portion thereof lying flat on flange 40 with damper plate 41 in its closed position. The bearing portion or bearing surface of damper plate 41 is in pivotal association with the bearing portion or bearing surface 39 of frame member 37. Surface 42 is adapted to pivot on surface 39 during opening and closing of damper member 41 with damper unit 23 in its top casing wall mounted position as shown in FIGURE 2.

Means in the form of cotter pins 43 are provided securing damper plate 41 in pivotal association with frame 37. Cotter pins 43 are passed through openings 44 in inward projecting flange 47, through enlarged openings 49 in the flanged portion 42 of plate 41 and are secured through openings 48 in inward flange 40 by spreading of the cotter pins 43 therebelow. Plate 41 is pivotally and facially slidably mounted on or impaled by cotter pins 43. Although plate 41 is facially slidable away from the mounting surface of frame member 37 and is slidably returnable thereto, cotter pins 43 function as means directing the facial sliding of plate 43 into proper pivotal contact with surface 42. In addition, with damper unit 23 disposed in mounted position over back wall opening 18 as illustrated in FIGURE 5, enlarged openings 49 provide for pivotal bearing of plate 40 against cotter pins 43 permitting pivoting of plate 41 with respect to surface 39 upon cotter pins 43 which retain plate 41 in position adjacent bearing surface 39. A stop member in the form of inward flange 50 is provided to prohibit movement of the bearing surfaces of plate 41 and frame member 37 a substantial distance apart, thereby maintaining the bearing surfaces in pivotal proximate association with each other.

A jamb member, such as inwardly turned flange 51, is provided on frame member 37 adjacent the outlet end of passage 38. In either side or top wall mounting position of damper unit 23, the outer arcing by movable edge portion of plate 41 rests by gravity against flange 51 when damper member 41 is in closed position. Thus, damper member 41 is unbalanced, with respect to the force of gravity thereon, in its pivotal association with either flange 40 or pin 43 or both.

The hood 10 may exhaust air through wall venting duct work in a building by utilization of opening 18 with damper unit 23 mounted thereacross and with cover 24 mounted across opening 17, or alternatively air may be exhausted from the top of the hood to duct work leading to the roof of a building through rectangular opening 17 with the damper unit and cover member in the respective positions as shown in FIGURE 1. The construction enables the selection and use of either opening before the hood is installed with simple relocation of the damper unit and cover, which are designed as readily interchangeable to facilitate the change-over.

In operation, electric motor 21 is energized by conventional electric source and circuitry means (not shown) and fan 22 is thereby rotated in such manner as to draw air in through inlet opening 22. With hood 10 positioned above a cooking surface, cooking gases from the cooking surface are drawn into housing 19 and forced through the passage formed by housing 19 and out through damper unit 23, i.e., through either opening 17 or 18 depending upon the positioning of damper unit 23. As the air or other gases pass through passage 38 of damper unit 23, plate 41 is pivoted to open position, e.g. as partially shown in dotted lines in FIGURE 2, and the gases are freely forced therethrough to the associated duct work. Upon stoppage of flow of air into and through housing 19, damper member 41 is permitted to fall by its own weight against jamb member 51 in closed position and remain there until further exhausting of gases by re-energization of motor 20. Any back draft of gases which would otherwise tend to flow through opening 17 passageway 38 from outside of housing 19, i.e., from the duct work associated with damper member 23, is substantially stopped in that plate 41 cannot be pivoted through passage 38 to open the passage for backflow of gases because of flange 41. Thus, the assembly functions as a check valve.

During passage of gases through passage 38 in the proper uni-directional flow for exhausting gases, plate member 41 is pushed upward or outward depending upon the mounting position of unit 23. However, stop member 50 prevents undue floating of the plate member 41 away from pivotal association with bearing surface 39.

I claim:

1. A ventilating hood having a blower for drawing air into the hood and discharging the air therefrom through either roof or wall duct work, said hood comprising a casing having a top wall and a back wall with an air exhaust opening in each of said walls, a blower housing fastened to the casing and having an air inlet port and walls defining an air exhaust passage leading from said inlet port to both said exhaust openings, a cover for one of said openings, a frame members defining a damper passage therethrough and having a bearing portion within said damper passage, a damper plate having a bearing portion, guide means mounting and supporting said damper plate thereon in said damper passage with the damper plate bearing portion opposing the frame bearing portion for pivoting the damper plate between a closed position blocking said damper passage and an open position unblocking said passage, said guide means mounting said damper plate thereon additionally for guided sliding movement of said damper plate away from and toward said frame at said bearing portions, stop plate means on said frame member adjacent said guide means and projecting into said damper passage for stopping the guided sliding movement of said damper plate on said guide means at a position with said damper plate in contact with said stop plate means and with said damper plate bearing portion away from said frame bearing portion a distance insufficient to open said damper passage, said stop means being of an extent blocking flow around said damper plate with said damper plate in the away position and in contact with said stop plate means, abutment means on the opposite side of said frame from said guide means in said damper passage offset from said bearing surfaces for stopping the pivotal movement of said damper plate at said closed position with said damper plate aslant, and means for releasably securing said frame and cover across either of said exhaust openings, said cover and frame being interchangeable across each of said openings.

2. A damper device which comprises a frame member defining a damper passage therethrough and having a bearing portion within said passage, a damper plate having a bearing portion, guide means mounting and supporting said damper plate thereon in said damper passage with the damper plate bearing portion opposing the frame bearing portion for pivoting the damper plate between a closed position blocking said damper passage and an open position unblocking said passage, said guide means mounting said damper plate thereon additionally for guided sliding movement of said damper plate away from and toward said frame at said bearing portions, stop plate means on said frame member adjacent said guide means and projecting into said damper passage for stopping the guided sliding movement of said damper plate on said guide means at a position with said damper plate in contact with said stop plate means and with said damper plate bearing portion away from said frame bearing portion a distance insufficient to open said damper passage, said stop means being of an extent blocking flow around said damper plate with said damper plate in the away position and in contact with said stop plate means, and abutment means on the opposite side of said frame from said guide means in said damper passage offset from said bearing surfaces for stopping the pivotal movement of said damper plate at said closed position with said damper plate aslant.

3. The damper device of claim 2 wherein said guide means comprises a pair of cotter pins impaling said damper plate and said frame member and mounting said damper plate within said frame member.

References Cited by the Examiner
UNITED STATES PATENTS

| | | | |
|---|---|---|---|
| 501,253 | 7/93 | Netzer | 98—119 |
| 2,741,972 | 4/56 | Pryne | 98—119 |
| 2,750,869 | 6/56 | Cole | 98—110 |
| 2,846,935 | 8/58 | Still | 98—119 |
| 2,971,451 | 2/61 | Feig | 98—115 |

FOREIGN PATENTS 347,713   8/60   Switzerland.

ROBERT A. O'LEARY, *Primary Examiner.*